United States Patent Office 3,314,574
Patented Apr. 18, 1967

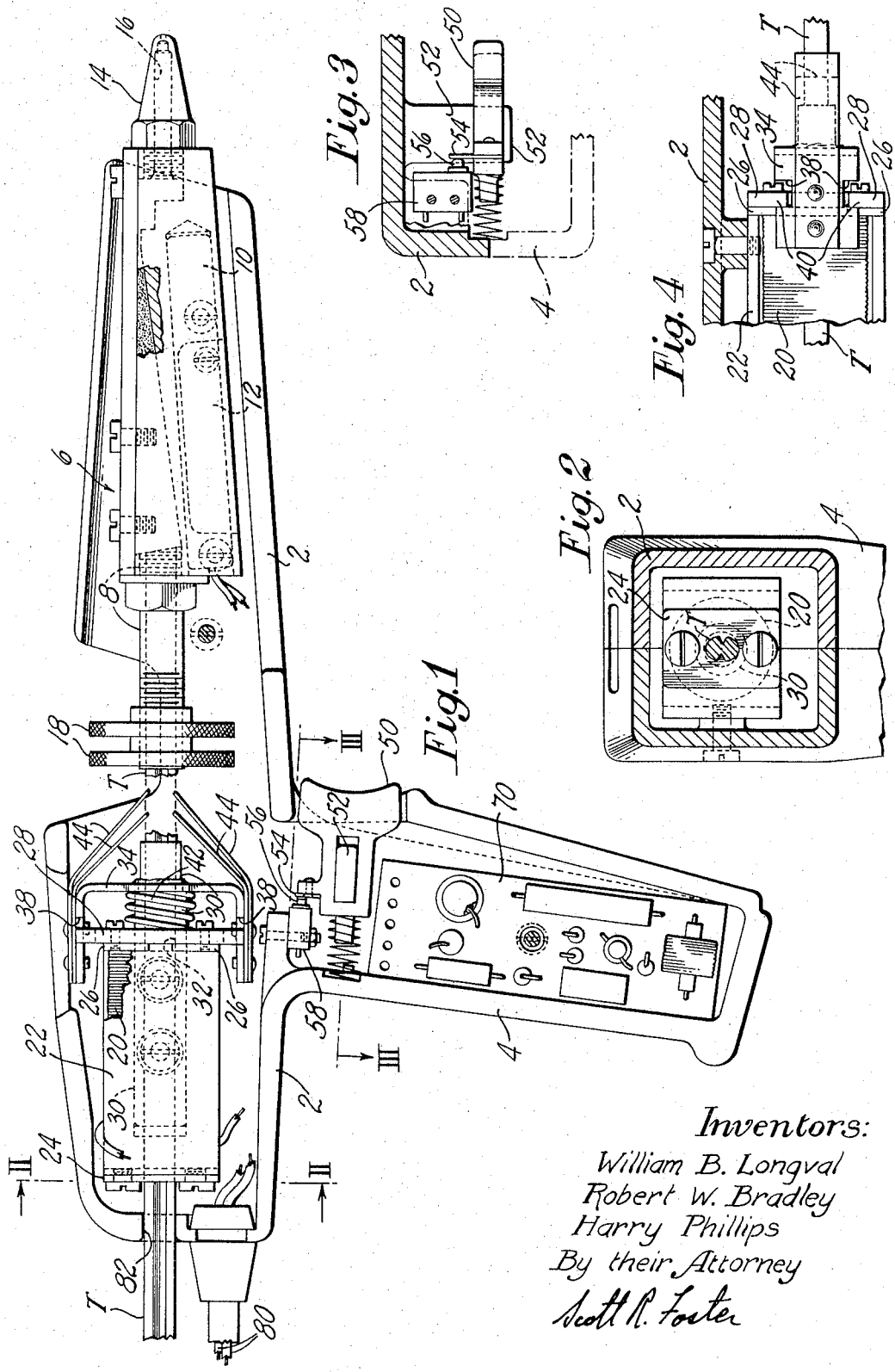

3,314,574
PLASTIC CEMENT HEATING, MELTING
AND EXTRUDING TOOL
William B. Longval, Danvers, Robert W. Bradley, Marblehead, and Harry Phillips, Hamilton, Mass., assignors to United Shoe Machinery Corporation, Flemington, N.J., a corporation of New Jersey
Filed Aug. 11, 1965, Ser. No. 478,950
11 Claims. (Cl. 222—146)

This invention relates to cement extruders and is directed more particularly to an improved hand held device for dispensing thermoplastic cement.

Thermoplastic cements have proved to be well suited for a wide variety of applications where small quantities of quick-setting adhesive materials are required. For this purpose a number of thermoplastic extruding devices have been developed for melting and applying thermoplastic cement. Tools for the application of thermoplastic cements often have a heatable barrel portion aligned with a passage in the frame of the tool. It is desirable that the tools be so constructed that the temperature of a thermoplastic material disposed in the passage in the frame of the tool be maintained below the melting point of the thermoplastic, while the temperature of the barrel portion is raised to a point sufficient to insure the melting of the thermoplastic disposed in that portion. A feed means is usually provided for urging the thermoplastic material through the passage in the frame to the heatable barrel portion, causing the melted material to be extruded from the barrel.

Small hand held cement extruders have been developed for both consumer and industrial use. In many instances, in order to maintain the tools light and inexpensive, they are not provided with any self-contained power means for feeding the thermoplastic material, for example, a rod of thermoplastic cement, to the heatable barrel portion, but instead, are fed by pressure from an operator's hand. In most instances where power feed means have been provided in the tool itself, the tool has been bulky and not easily handled. More recently, there have been developed hand held cement extruders containing small electric rotary motors and which are reasonably light and inexpensive, relative to prior standards. However, it is desirable to have a hand held cement extruder having a power feed means but not having the weight and expense inherent in a self-contained electrical motor with its attendant reduction gears, cooling means, etc.

Accordingly, it is one object of the invention to provide a lightweight and inexpensive portable melting and dispensing tool having a power feed means. More specifically, it is an object of the invention to provide such power feed means of substantially less weight and appreciably less cost than means powered by electric rotary motors.

It is another object of the invention to provide a power feed means which urges cement rod material stepwise into the barrel portion, the rate of operation of such feed means being so rapid that a substantially uniform flow of molten cement is realized at the extruding end of the barrel.

With the foregoing objects in view and in accordance with features of this invention, there is provided in a hand held tool for extruding and applying cement a unique feed means comprising a coil spring, means operable by the expansion of said spring and engageable with a solid thermoplastic rod to push the rod toward the heatable barrel portion of the device, means for compressing the spring, and means for governing the rate at which the feed means pushes the cement rod toward the barrel member.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in numerous and varied embodiments without departing from the scope of the invention.

In the drawings:

FIG. 1 is an elevational view of one form of extruder embodying the invention, with the right side cover removed and with portions removed for clarity;

FIG. 2 is a sectional view taken along line II—II of FIG. 1;

FIG. 3 is a sectional view taken along line III—III of FIG. 1;

FIG. 4 is a plan view of a portion of the feed means of the extruder;

Figure 6:
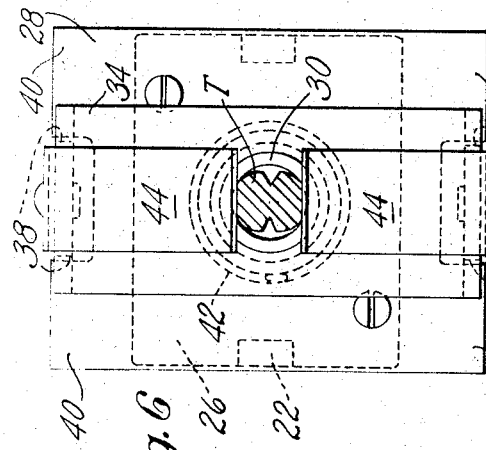
FIG. 6 is a sectional view taken along line VI—VI of FIG. 5.

Referring to the drawings, it may be seen that the preferred embodiment of the present invention comprises a frame 2 having a grip portion 4. On the frame 2 there is mounted a barrel assembly 6 which includes a barrel 8 in which a thermoplastic rod T is transformed from a solid to a liquid state, a heating element 10 (FIG. 1) which affords the heat necessary to melt the thermoplastic rod, and a thermostat 12 which controls the level of the heat in the barrel 8. At one end of the barrel 8 there is disposed a nozzle 14 having an aperture 16 through which molten plastic is extruded. The other end of the barrel 8 is threaded to receive heat dissipating discs 18 which provide for air cooling of the barrel at its entrance to prevent premature melting of the rod T.

Also supported by the frame 2 is a solenoid 20 (FIGS. 1 and 4) enclosed in a casting 22 having end plates 24, 26. A face plate 28 is attached by screws to the end plate 26. The solenoid 20 includes a core in the form of a cylindrical member 30 which passes through an aperture 32 (FIGS. 1 and 5) in the face plate 28. Attached to one end of the cylindrical member or core 30 is a feed means mounting plate 34 having an aperture 36 (FIG. 5) for receiving the reduced end of the cylindrical member 30. The feed means mounting plate 34 is provided with notches 38 which receive lug portions 40 of the face plate 28 (FIGS. 4 and 6). A coil spring 42 (FIGS. 1 and 5) is mounted on the cylindrical member 30 between the face plate 28 and the feed means mounting plate 34, urging the plates 28, 34 away from each other. Attached to the feed means mounting plate 34 are a number of flexible feed blades 44 which are engageable with the solid thermoplastic rod T. When the solenoid 20 is energized, it draws in the cylindrical member 30, or causes it to move toward the left as viewed in FIGS. 1 and 5, compressing the spring 42 between the face plate 28 and the feed blade mounting plate 34, the latter moving with the cylindrical member 30 toward the solenoid. The mounting plate 34 moves leftwardly until the lug portions 40 of the face plate 28 engage the edges of the notches 38 of the plate 34, stopping further movement of the plate 34. As the blade mounting plate 34 moves leftwardly it carries with it the feed blades 44 which, because of their flexibility and angular displacement, relative to the thermoplastic rod T, ride easily along the rod.

Figure 5:
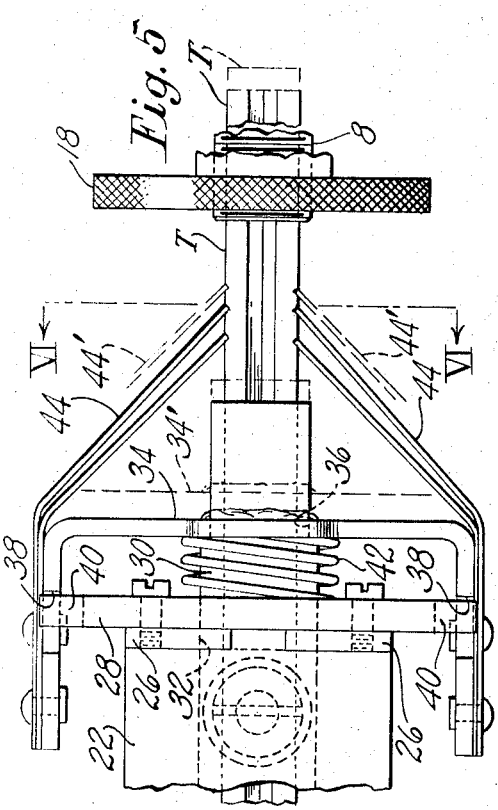
FIG. 5 is a detailed elevational view of the feed means.

When the solenoid is de-energized, the spring 42 causes the mounting plate 34 to move away from the solenoid, or to the right as viewed in FIGS. 1 and 5, to a position indicated by 34' in FIG. 5. When the feed blades start travelling away from the solenoid, they tend to "dig into" the thermoplastic rod T sufficiently to cause the rod T to move with the blades 44. Accordingly, rapid energization and de-energization of the solenoid causes thermoplastic rod to move toward and into the barrel 8 for melting and extrusion.

For the purpose of starting and stopping the operation of the solenoid, the tool is provided with a spring biased trigger 50 (FIGS. 1 and 3) supported by a lug 52 extending inwardly from the frame 2. The trigger 50 carries a contact plate 54 which is engageable with a plunger 56 disposed in a start switch 58 mounted on the frame 2.

Figure 7:
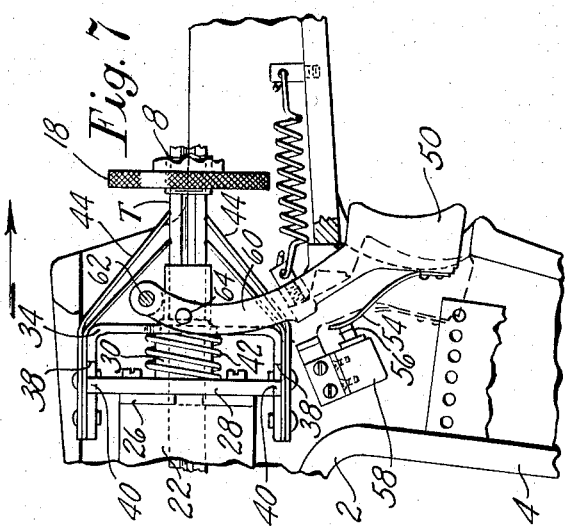
FIG. 7 is a partial elevational view of an alternative embodiment showing an output governing means.

Referring to FIG. 7, there is shown an alternative trigger arrangement in which an arm 60 extends from the trigger 50 and is mounted at one end on a pivot pin 62 held by the frame 2. At limit pin 64 is attached to the arm 60 and is engageable with the feed means mounting plate 34. When the trigger is moved leftwardly, as viewed in FIG. 7, the contact plate 54 engages the start switch 58, and as the trigger is moved farther to the left the limit pin 64 is caused to move toward the solenoid, progressively reducing the distance through which the spring 30 is able to move the mounting plate 34. Thus, although the frequency of operation of the solenoid remains constant, the rate of feed and consequently the rate of extrusion, is diminished. Alternatively, the frequnecy of solenoid energization may be decreased electrically, although this approach is limited by the desirability of having a smooth extrusion of fluid as opposed to a pulsing extrusion.

In the operation of the device, the solenoid is continuously energized and de-energized at a rapid rate so long as the trigger is held against the start switch. An electrical circuit 70 for accomplishing this is contained in the grip portion 4 of the device, as shown in FIG. 1. The circuit 70 is illustrated diagrammatically in FIG. 8 where it may be seen to comprise means for transmitting current from an alternating current source (ordinary household outlet, for example), through the solenoid 20, and through a diode D, to a voltage regulating circuit. The voltage regulating circuit comprises a resistor $R_1$ and a Zener diode $D_2$ which supply regulated direct current to a capacitor C through a second resistor $R_2$. The capacitor C is connected to the emitter of a unijunction transistor Tr which acts as a relaxation oscillator in discharging pulses from the capacitor C. A silicon controlled rectifier SCR is connected in circuit with the solenoid 20 for permitting half wave discharge through the solenoid when the rectifier SCR is fired. A capacitor and inductance circuit CI insures that the unijunction transistor Tr discharges the capacitor C immediately after breakdown of the Zener diode $D_2$, to insure uniform pulse duration to the solenoid. Release of the trigger breaks contact between the plate 54 and the start switch 58, whereupon the switch 58 opens, interrupting the circuit and terminating the energization of the solenoid 20.

In order to utilize the tool, an operator need only connect leads 80 to an ordinary electrical outlet and manually insert the leading end of a length of thermoplastic rod into an aperture 82 (FIG. 1) in alignment with the cylindrical member 30. The rod is pushed by hand through the solenoid 20 and the cylindrical member 30 and into the barrel 8 which quickly becomes sufficiently heated to melt the rod. When a quantity of molten cement is desired, the operator depresses the trigger 50 and the operation of the solenoid and feed blades 44 serve to feed the rod T to the barrel 8 and thereby force molten cement in the barrel out of the nozzle 14.

Figure 8:
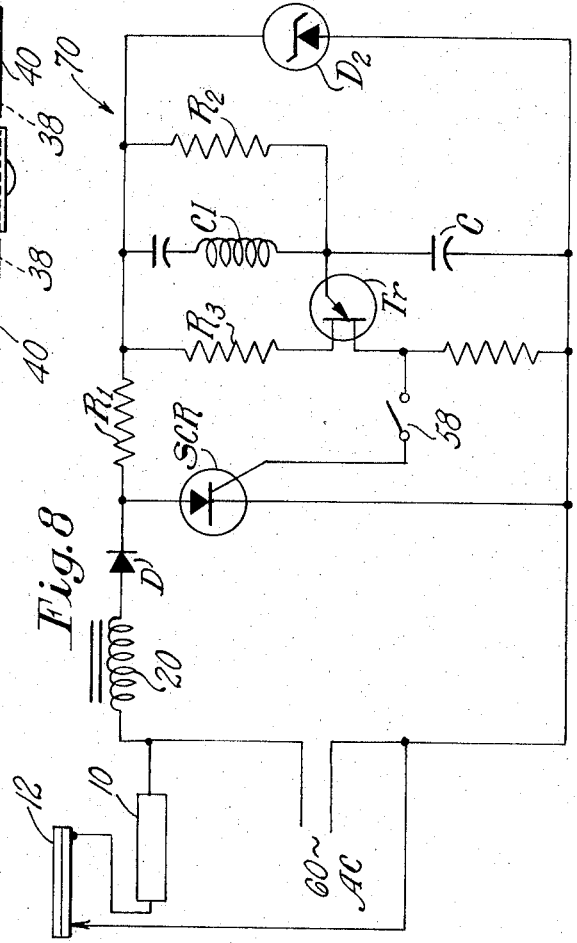
FIG. 8 is a diagrammatic illustration of the electrical circiut of the device.

The solenoid is energized and de-energized at such a rapid rate by the circuit shown in FIG. 8 that although the movement of rod material into the barrel is incremental, the flow of molten material from the barrel is smooth and substantially free of pulsations. Release of the trigger instantly terminates operation of the solenoid and therefore extrusion from the nozzle. Thus, the device provides the advantages of a power driven feed means but without the usual inherent disadvantages of relatively high cost and weight.

Having thus described our invention, what we claim as new and desire to secure by Letters Patent of the United States is:

1. A cement extruding tool comprising a frame, a heatable barrel mounted on said frame for receiving at one end a thermoplastic cement rod, means for heating said barrel, nozzle means at the other end of said barrel having an aperture for extruding molten thermoplastic, a trigger mounted on said frame, and feed means mounted on said frame for using said thermoplastic rod into said barrel, said feed means comprising rod engaging members, a compressible spring which upon release and during subsequent expansion moves said rod engaging members from a point remote from said barrel in a direction toward said one end of said barrel, and means responsive to the movement of said trigger for alternately compressing and releasing said spring.

2. In a cement extruding tool having a heatable barrel member for receiving a thermoplastic cement rod at one end and extruding molten cement from the other end and having means for heating said barrel, a feed means for urging said rod toward said barrel comprising feed blades engageable with said rod, feed blade mounting means having said feed blades fixed thereto, a spring in contact with said mounting means, means for moving the mounting means against the influence of said spring whereby to compress said spring, and means for interrupting said moving means, whereby said mounting means is urged toward said barrel by the expansion of said spring.

3. In a cement extruding tool having a heatable barrel member for receiving a thermoplastic cement rod at one end and extruding molten cement from the other end and having means for heating said barrel, a feed means for urging said rod toward said barrel comprising feed blades engageable with said rod, feed blade mounting means having one end of each feed blade fixed thereto, a core member fixed to said mounting means, a coil spring mounted about said core member, means for moving said core member away from said barrel member whereby to compress said spring between said moving means and said mounting means, and means for releasing said core member which is then caused to move toward said barrel member by the expansion of said spring.

4. In a cement extruding tool having a heatable barrel member for receiving a thermoplastic cement rod at one end and extruding molten cement from the other end and having barrel heating means, a feed means for urging said rod toward said barrel comprising a solenoid mounted on said frame, means for alternately energizing and de-energizing said solenoid, a mounting plate movable in a direction away from said barrel and toward said solenoid along the axis of said barrel in response to the energizing of said solenoid, a spring member disposed between said solenoid and said mounting plate, said mounting plate being movable toward said barrel along the axis of said barrel by said spring when said solenoid is de-energized, and rod engaging means mounted on said mounting plate.

5. In a cement extruding tool having a heatable barrel member for receiving a thermoplastic cement rod at one end and extruding molten cement from the other end, a feed means for urging said rod toward said barrel comprising a solenoid mounted on said frame, means for alternately energizing and de-energizing said solenoid, a core member disposed in the annulus of said solenoid and having one end extending therefrom, a mounting plate fixed to said end of said core member, a spring disposed around said core member and between said solenoid and said mounting plate, and rod engaging means mounted on said mounting plate, whereby upon energizing said solenoid said core member and said mounting plate move to compress said spring, and whereby upon de-energizing said solenoid the expansion of said spring moves said core member and said mounting plate from points remote from said barrel and in axial alignment with said barrel toward said barrel member thereby to move said rod engaging means toward said barrel member.

6. The invention according to claim 5 having means for selectively determining the extent of the movement of said mounting plate toward said barrel member.

7. The invention according to claim 2 in which said mounting means is urged from a point remote from said barrel and in axial alignment with said barrel toward said barrel by the expansion of said spring.

8. The invention according to claim 3 in which upon release of said core member said core member is caused to move from a point remote from said barrel member and in axial alignment with said barrel member toward said barrel member by the expansion of said spring.

9. The invention according to claim 7 in which said feed blades comprise leaf spring members which at one end are attached to said blade mounting means.

10. In a cement extruding tool having a barrel member for receiving meltable rod material at a first end and extruding the material in a molten state from a second end, and having barrel heating means, a feed means for urging said rod toward the first end of said barrel and thereafter through said barrel, said feed means comprising a solenoid having its annulus in axial alignment with said barrel, core means slidably disposed in said annulus, blade mounting means fixed to said core means, a coil spring disposed about said core means and between said solenoid and said blade mounting means, blades engageable with said rod and attached to said mounting means, and means for alternately energizing and de-energizing said solenoid.

11. The invention according to claim 10 in which said feed blades comprises leaf spring members which at one end are attached to said blade mounting means.

References Cited by the Examiner

UNITED STATES PATENTS

| | | | |
|---|---|---|---|
| 1,977,532 | 10/1934 | Taylor et al. | 222—391 X |
| 2,556,609 | 6/1951 | Arkless | 219—227 |
| 2,681,685 | 6/1954 | Arkless | 219—227 |
| 2,740,553 | 4/1956 | Maynard | 222—333 X |
| 2,765,390 | 10/1956 | Chapel et al. | 228—53 |
| 2,889,085 | 6/1959 | Collins | 222—391 |
| 3,140,803 | 7/1964 | Ebersole et al. | 222—391 |
| 3,199,740 | 8/1965 | Juffa et al. | 222—146 |
| 3,204,828 | 9/1965 | Paulsen | 222—146 |
| 3,219,251 | 11/1965 | Davis | 228—53 |

RAPHAEL M. LUPO, *Primary Examiner.*